United States Patent
Lightstone et al.

(10) Patent No.: US 8,880,806 B2
(45) Date of Patent: Nov. 4, 2014

(54) RANDOMIZED PAGE WEIGHTS FOR OPTIMIZING BUFFER POOL PAGE REUSE

(75) Inventors: Sam S. Lightstone, Toronto (CA); Adam J. Storm, Toronto (CA)

(73) Assignee: International Business Machines Corporation, Armonk, NY (US)

(*) Notice: Subject to any disclaimer, the term of this patent is extended or adjusted under 35 U.S.C. 154(b) by 185 days.

(21) Appl. No.: 13/560,700

(22) Filed: Jul. 27, 2012

(65) Prior Publication Data

US 2014/0032851 A1 Jan. 30, 2014

(51) Int. Cl.
*G06F 12/00* (2006.01)

(52) U.S. Cl.
USPC .......................................... 711/133; 711/118

(58) Field of Classification Search
None
See application file for complete search history.

(56) References Cited

U.S. PATENT DOCUMENTS

| | | | |
|---|---|---|---|
| 5,822,749 A | 10/1998 | Agarwal | |
| 7,366,855 B2 | 4/2008 | Kim et al. | |
| 7,401,069 B2 | 7/2008 | Day et al. | |
| 2001/0047394 A1* | 11/2001 | Kloba et al. | 709/217 |
| 2005/0005080 A1 | 1/2005 | Dunshea et al. | |
| 2008/0046655 A1* | 2/2008 | Bhanoo et al. | 711/133 |
| 2011/0035369 A1 | 2/2011 | Halasipuram et al. | |
| 2012/0054445 A1* | 3/2012 | Swart et al. | 711/133 |

OTHER PUBLICATIONS

Xiaoning Ding et al., "A Buffer Cache Management Scheme Exploiting Both Temporal and Spatial Localities," ACM Transactions on Storage, vol. 3, No. 2, Article 5, Publication Date: Jun. 2007 (27 pages).

Song Jiang, "CLOCK-Pro: An Effective Improvement of the CLOCK Replacement," Proceeding ATEC 2005 Proceedings of the Annual Conference on USENIX Annual Technical Conference, http://www.usenix.org/events/usenix05/tech/general/full_papers/jiang/jiang_html/html.html, last printed Sep. 27, 2011 (25 pages).

Yannis Smaragdakis et al., "EELRU: Simple and Effective Adaptive Page Replacement," Proceeding SIGMETRICS 1999 Proceedings of the 1999 ACM SIGMETRICS International Conference on Measurement and Modeling of Computer Systems, http://citeseerx.ist.psu.edu/viewdoc/download?doi=10.1.1.116.2184&rep=rep1&type=pdf, pp. 122-133 (1999).

Song Jiang et al., "LIRS: An Efficient Low Inter-reference Recency Set Replacement Policy to Improve Buffer Cache Performance," Proceeding ISGMETRICS 2002 Proceedings of the 2002 ACM SIGMETRICS International Conference on Measurement and Modeling of Computer Systems, http://citeseerx.ist.psu.edu/viewdoc/download?doi=10.1.1.116.2184&rep=rep1&type=pdf, (12 pages) (2002).

* cited by examiner

*Primary Examiner* — Shawn X Gu
(74) *Attorney, Agent, or Firm* — Shumaker & Sieffert, P.A.

(57) ABSTRACT

In general, the disclosure is directed to techniques for choosing which pages to evict from the buffer pool to make room for caching additional pages in the context of a database table scan. A buffer pool is maintained in memory. A fraction of pages of a table to persist in the buffer pool are determined. A random number is generated as a decimal value of 0 to 1 for each page of the table cached in the buffer pool. If the random number generated for a page is less than the fraction, the page is persisted in the buffer pool. If the random number generated for a page is greater than the fraction, the page is included as a candidate for eviction from the buffer pool.

22 Claims, 6 Drawing Sheets

PAGES IN DATABASE TABLE: 30 PAGES
OPTIMAL PERCENTAGE OF PAGES : 10%
PERCENTAGE OF OPTIMAL: 33%

RANDOMIZED PAGE WEIGHTS FOR OPTIMIZING BUFFER POOL PAGE REUSE

TECHNICAL FIELD

The disclosure relates to memory management, more specifically to selecting data to evict from a buffer pool.

BACKGROUND

A database is made up of database tables, and database tables of the database can be divided into pages. A buffer pool acts as a cache for a database and can cache pages of database tables. A client can request access to pages of the database, such as by performing a table scan of a database table in the database. If a requested page is cached in the buffer pool, then that page can be accessed by the client without having to physically access the database on secondary storage. However, if a requested page is not cached in the buffer pool, the page must be loaded from secondary storage (i.e. hard disk drives), and placed in the buffer pool. If the buffer pool is full, then pages are evicted to make room in the buffer pool to cache the requested page.

A client can perform a database table scan to access every page of a specific database table. In situations where the amount of pages of the database table exceeds the capacity of the buffer pool, current techniques for evicting pages from the buffer pool may lead to poor page reuse in the buffer pool. For example, given a database table made up of six pages and a buffer pool with a capacity of three pages, the buffer pool may first cache the first page, the second page, and the third page of the six-page database table. Because the buffer pool is now full, an additional page cannot be cached in the buffer pool without first evicting a page from the buffer pool.

A least recently used (LRU) algorithm, which evicts the least recently used page from the buffer pool, is a typical algorithm for determining which pages to evict form the buffer pool. After the first three pages of the database table are cached in the buffer, the LRU algorithm evicts the first page to store the fourth page into the buffer pool, then evicts the second page to store the fifth page into the buffer pool, and finally evicts the third page to cache the sixth page into the buffer pool. After the database table scan finishes, the buffer pool will contain the fourth page, the fifth page, and the sixth page of the database table.

If the client re-scans the same database table, no page reuse occurs because none of the first three pages accessed during the re-scan (i.e., the first page, the second page, and the third page) are cached in the buffer pool, and evicting the fourth page, the fifth page, and the sixth page from the buffer pool to cache the first page, the second page, and the third page into the buffer pool leads to no page reuse in the buffer pool when the fourth page, the fifth page, and the sixth page of the database table is being accessed during the course of the re-scan.

SUMMARY

In general, the disclosure is directed to techniques for choosing which pages to evict from the buffer pool to make room for caching additional pages in the context of a database table scan. The goals of the techniques disclosed herein may include achieving a reasonable amount of page reuse if a database table scan is immediately repeated, preserving as much of the existing pages cached in the buffer pool as possible such that only a small amount of pages are evicted from the buffer pool in the case of the database table scan never being repeated, and achieving near-optimal page reuse if the same database table scan is repeated a certain number of times.

Instead of attempting to cache every page of a database table in the buffer pool, the techniques disclosed herein may attempt to persist in the buffer pool a subset of the pages in the database table. For example, given a buffer pool capacity of 10,000 pages and a database table size of 100,000 pages, the buffer pool can persist no more than 10% (i.e., no more than 10,000 pages) of the database table. Furthermore, because a database likely contains more than one database table, each of which may be scanned at some point, a single database table should not be able to take over a large portion of the entire buffer pool unless the single database table has been scanned several times in recent history, or if it is certain that the single database table will repeatedly be re-scanned. Thus, for a single database table, the amount of pages initially persisted in buffer pool may make up no more than 20%-50% of the capacity of the buffer pool. To determine the fraction of pages of the database table to persist in the buffer pool, the fraction of pages in the database table that can be cached in the buffer pool is multiplied by the fraction of the buffer pool allotted for pages of the database table to determine the fraction of pages of the database table to be persisted in the buffer pool. For example, if it is determined for a database table having a size of 100,000 pages and a buffer pool having a capacity of 10,000 pages that the amount of pages persisted in the buffer pool should make up approximately 20% of the capacity of the buffer pool, then the fraction of pages of the database table to be persisted in the buffer pool may be 0.1 (10,000/100,000) multiplied by 0.2 (20%), which equals 0.02 (i.e., 2%).

As a database table is being scanned, pages of the database table can be cached in the buffer pool, and the client scanning the database table can access the pages in the buffer pool. After the pages are accessed by the client, a decision can be made whether to persist the pages in the buffer pool so that the pages remain in the buffer pool after the conclusion of the database table scan. After a page is accessed by the client, a random number having a decimal value (between 0 and 1) is generated for that page. If the value of the random number is smaller than the fraction of pages of the database table to persist in the buffer pool, then the page is persisted in the buffer pool. Conversely, if the value of the random number is larger than the fraction of pages of the database table to persist in the buffer pool, then the page is included as a candidate for eviction from the buffer pool.

In one aspect, the disclosure is directed to a method. The method may include maintaining a buffer pool in memory. The method may further include determining a fraction of pages of a table to persist in the buffer pool. The method may further include generating a random number as a decimal value in a range of 0 to 1 for each page of the table cached in the buffer pool. The method may further include, if the random number generated for a page is less than the fraction, persisting the page in the buffer pool. The method may further include, if the random number generated for the page is greater than the fraction, including the page as a candidate for eviction from the buffer pool.

In another embodiment, the disclosure is directed to a computer-readable storage medium containing instructions. The instructions may cause a programmable processor to maintain a cache. The instructions may further cause a programmable processor to determine a fraction of objects of a memory to persist in the cache. The instructions may further cause a programmable processor to generate a random number as a decimal value in a range of 0 to 1 for each object of the memory cached in the cache. The instructions may further cause a programmable processor to, if the random number generated for an object is less than the fraction, persist the object in the cache. The instructions may further cause a programmable processor to, if the random number generated for the object is greater than the percentage, include the object as a candidate for eviction from the cache.

In another aspect, the disclosure is directed to a computing system. The computing system may include a processor. The computing system may further include memory. The computing system may further include a buffer pool maintained in the memory. The computing system may further include a buffer management module operable by the processor and configured to: determine a fraction of pages of a table to persist in the buffer pool; generate a random number as a decimal value in a range of 0 to 1 for each page of the table cached in the buffer pool; if the random number generated for a page is less than the fraction, persist the page in the buffer pool; and if the random number generated for the page is greater than the fraction, include the page as a candidate for eviction from the buffer pool.

In another aspect, the disclosure is directed to a method. The method may include maintaining a cache. The method may further include determining a fraction of objects of a memory to persist in the cache. The method may further include persisting in the cache an amount of objects of the memory based on the determined fraction of objects of the memory to persist in the cache. The method may further include including as candidates for eviction from the cache one or more objects of the memory in the cache that are not included in the amount of objects.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
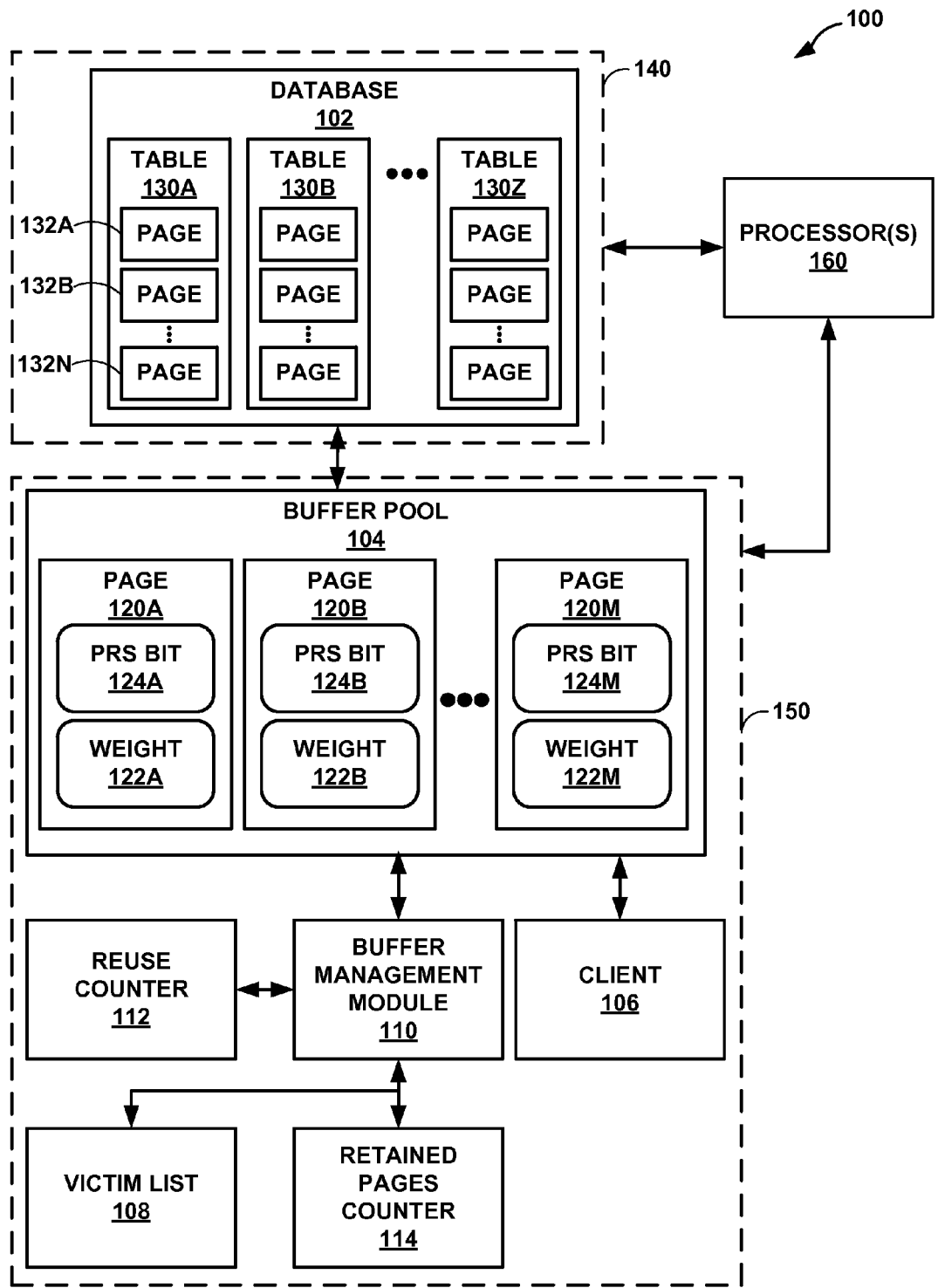
FIG. 1A is a block diagram illustrating an example computing system according to some aspects of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a block diagram illustrating an example computing system according to some aspects of the disclosure. As shown in FIG. 1A, computing system 100 may include database 102, buffer pool 104, client 106, victim list 108, and buffer management module 110. Client 106 may perform a table scan on database 102. Pages of the database table being scanned may be cached in buffer pool 104. As further table scans are performed on database 102, additional pages of database tables may be stored in buffer pool 104. As buffer pool 104 becomes full, pages may be evicted from buffer pool 104. Pages that are candidates for eviction from buffer pool 104 may be listed in victim list 108.

Computing system 100 may include one or more computing devices having one or more processors 160, including but not limited to one or more server devices and/or the cloud. Client 106 may be an application stored in memory 150 of computing system 100 that is operable by one or more processors 160 to access database 102 and buffer pool 104.

Computing system 100 may include storage device 140 and memory 150. Memory 150, in one example, is configured to store information within computing system 100 during operation. Memory 150, in some examples, is described as a computer readable storage medium. In some examples, memory 150 is a temporary memory, meaning that a primary purpose of memory 150 is not long-term storage. Memory 150, in some examples, is described as a volatile memory, meaning that memory 150 does not maintain stored contents when computing device 100 is turned off. Examples of volatile memories may include random access memories (RAM), dynamic random access memories (DRAM), static random access memories (SRAM), and other forms of volatile memories known in the art. In some examples, memory 150 is used to store program instructions for execution by processors 160. Memory 150, in one example, is used by software or applications running on computing system 100 to temporarily store information during program execution.

Storage devices 140 in some examples, also includes one or more computer readable storage media. Storage devices 140 may be configured to store larger amounts of information than memory 150. Storage devices 140 may further be configured for long-term storage of information. In some examples, storage devices 140 include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing system may also include one or more processors 160, which may be one or more programmable processors that are operable to execute instructions stored on storage device 140 and memory 150.

Database 102 is any organized collection of data and may be maintained in storage device 140 of computing system 100. Data in database 102 is organized into database tables 130A-130Z ("tables 130"), and each table in tables 130 is made up of pages 132A-132N "pages 132"). In some examples, data in tables 130 are organized into rows and columns, and a page of a table, in some examples, includes one or more rows of the database table or one or more column values.

Buffer pool 104 is be maintained in memory 150 of computing system 100 and is operable to cache pages 132 of database tables 130 in database 102. For example, if client 106 sends a read request for a page of a database table in database 102, the requested page is placed in buffer pool 104. If client 106 subsequently makes another request for a page of a database table in database 102, buffer pool 104 is checked for that requested page. If the requested page is cached in buffer pool 104, the requested page is accessed from buffer pool 104 without having to physically access database 102. Cached pages 120A-120M ("cached pages 120") may each include a page randomly saved bit out of page randomly saved bits 124A-124M and may be associated with a weight out of weights 122A-122M. The weight associated with a cached page is either zero or non-zero, and the page randomly saved bit for the cached page is 1 if the associated weight is non-zero and is 0 if the associated weight is zero.

Victim list 108 may be maintained in memory 150 and includes a list of one or more pages that are candidates for eviction (e.g., victims) from buffer pool 104. If buffer pool 104 is full, buffer pool 104 is not able to cache an additional page without evicting a currently-cached page, and the page to be evicted from buffer pool 104 is chosen from the pages listed in victim list 108.

Buffer management module 110 manages buffer pool 104. Buffer management module 110 may optimize page reuse within buffer pool 104, including determining which pages to retain in buffer pool 104 and which pages can be evicted from buffer pool 104. If it can be predicted that the same table scan of the database table having pages cached in buffer pool 104 will be repeatedly performed, then the pages of that database table may remained cached in buffer pool 104. Conversely, if it can be predicted that the same table scan of the database table having pages cached in buffer pool 104 will not be performed again, then the pages of the database table should be evicted from buffer pool 104. However, because it is difficult to predict the future access patterns for a given database table, buffer management module 110 optimizes page reuse by persisting a specified amount of pages of the database table in buffer pool 104 and including the other pages of the database table cached in buffer pool 104 as candidates for eviction from buffer pool 104.

Buffer management module 110 determines the percentage pages of a specific database table that can be cached at the same time in buffer pool 104. For example, given a capacity of 10,000 pages for buffer pool 104 and a database table size of 100,000 pages, the maximum percentage of pages of the database table that can be cached at the same time in buffer pool 104 is 10% (i.e., 10,000 pages). The 10% of the pages in the database table that can be cached at the same time in buffer pool 104 can be considered the optimal percentage of the pages in the database table.

To prevent pages from a single database table from monopolizing buffer pool 104, buffer management module 110 determines, for a table scan, the percentage of space in buffer pool 104 that is allocated for retaining pages of the database table. This percentage can also be expressed as a percentage of the optimal percentage of the pages in the database table because, as discussed above, the optimal percentage of the pages in the database table indicates the percentage of the pages in the database table that can be cached at the same time in buffer pool 104. In some examples, the percentage of the optimal percentage is approximately 20% to 50%, and the percentage of the optimal percentage can be pre-specified or can be dynamically determined and readjusted based on feedback from previous database table scans.

Buffer management module 110 optimizes page reuse in buffer pool 104 by persisting a specified percentage of the pages of the database table in buffer pool 104 and marking the rest of the pages of the database table as candidates for eviction from buffer pool 104. The percentage of pages in the database table to retain in buffer pool 104 is determined by multiplying the optimal percentage of the pages in the database table by a percentage of the optimal percentage. To that end, buffer management module 110 generates, for each page of the database table cached in buffer pool 104, an associated random number as a decimal value in a range of 0 to 1. If the random number generated for a page is less than the fraction of pages of the database table to persist in buffer pool 104, then buffer management module 110 persists the page in buffer pool 104, including associating the page with a non-zero weight. For example, the non-zero weight associated with the page may be the same number for all pages associated with a non-zero weight. The non-zero weight associated with the page may also be different for each page. On the other hand, if the random number generated for the page is greater than the percentage of pages of the database table to persist in buffer pool 104, then buffer management module 110 includes the page as a candidate for eviction from the buffer pool, including associating the page with a zero weight and adding the page to victim list 108. In other examples, if the random number generated for a page is less than the fraction of pages of the database table to persist in buffer pool 104, instead of associating the page with a non-zero weight, the associated page randomly saved bit 124 may be set to 1. As discussed above, pages that are candidates for eviction are listed in victim list 108, and the pages to be evicted from buffer pool 104 are chosen from the pages listed in victim list 108 provided that victim list 108 is not empty. In some examples, the random number generated for pages may also be weighed based on the cost of accessing those pages from database 102, so that the random number generated for a page may be weighed towards persisting the page in buffer pool 104 (e.g., by weighing the random number generation towards generating a number on the lower end of the range) if the cost of accessing the page from database 102 is very high (e.g., above a specified threshold).

The percentage of the optimal percentage can be adjusted based on feedback regarding the reuse rate of pages cached in buffer pool 104. Each page associated with a non-zero weight (i.e., pages that are to be retained in buffer pool 104) has a corresponding page randomly saved bit set to 1, indicating that the page is associated with a non-zero weight. Retained pages counter 114 keeps track of the number of retained pages by incrementing itself for each association of a page of the database table with a non-zero weight, or each time an associated page randomly saved bit of a page turns on, due to the random number generated by buffer management module 110. Reuse counter 112 keeps track of the number of occurrences of reuse of retained pages. If a page of the database table retained in buffer pool 104 is reused, the page is examined to determine if the page randomly saved bit is set to 1 and, if so, reuse counter 112 is incremented to indicate that page reuse occurred. The efficacy of page reuse for buffer pool 104 is calculated by dividing reuse counter 112 by retained pages counter 114. If the efficacy of page reuse for buffer pool 104 does not fall within an specified range, then the amount of pages of the database table being scanned that can be stored in buffer pool 104 may be adjusted upwards or downwards to cause the efficacy of page reuse for buffer pool 104 to fall within the specified range. For example, if the efficacy of page reuse for buffer 104 is below the specified range, then the percentage of the optimal percentage may be decreased so that fewer pages from the database table are retained in buffer pool 104. Conversely, if the efficacy of page reuse for buffer 104 is above the specified range, then the percentage of the optimal percentage may be increased so that more pages from the database table are retained in buffer pool 104. In other examples, the percentage of the optimal percentage can also be adjusted based on a likelihood of the table being scanned again. The likelihood may be specified by user input or may be determined based on past access patterns of the database table. If the table is not likely to be scanned again, then the percentage of the optimal percentage may be set to zero or close to zero.

In some examples, buffer pool 104 may be a cache in computing system 100 that may cache objects besides pages of database tables. Instead, buffer pool 104 may be able to cache any objects or files that are stored in memory of computing system 100. Those objects, like pages 120, may be associated with page randomly saved bits 124 and weights 122A. Similar to what is described above, buffer pool 104 can optimize object reuse by persisting a specified percentage of the objects from memory in buffer pool 104 and marking the rest of the objects in memory as candidates for eviction from buffer pool 104. The percentage of objects in memory to retain in buffer pool 104 is determined by multiplying the optimal percentage of the objects in memory by a percentage of the optimal percentage. To that end, buffer management module 110 generates, for each objects in memory that is cached in buffer pool 104, an associated random number as a decimal value in a range of 0 to 1. If the random number generated for an object is less than the fraction of objects of the memory to persist in buffer pool 104, then buffer management module 110 persists the object in buffer pool 104, including associating the object with a non-zero weight. On the other hand, if the random number generated for the object is greater than the percentage of objects of the memory to persist in buffer pool 104, then buffer management module 110 includes the object as a candidate for eviction from the buffer pool, including associating the object with a zero weight and adding the object to victim list 108. In other examples, if the random number generated for a page is less than the fraction of objects of the memory to persist in buffer pool 104, instead of associating the object with a non-zero weight, an associated page randomly saved bit 124 may be set to 1.

In some examples, instead of randomizing the pages or objects to persist or evict from buffer pool 104, the first N number of pages or objects may be persisted or evicted from buffer pool 104. For example, if a database table being scanned includes 30 pages, if buffer pool 104 has a capacity of 3 pages and currently caches 3 pages, and if the optimal percentage of pages in the database table to persist in buffer pool 104 is 10%, then the percentage of the optimal percentage is 33%, so that the buffer pool is designed to persist one of the pages of the database table. Instead of randomizing which pages to evict from buffer pool 104, the first two pages from the database table that is encountered may be evicted from buffer pool 104. Alternatively, the first page from the database table that is encountered may be persisted in buffer pool 104, and the rest of the pages from the database table may be evicted (e.g., put on victim list 108).

Figure 1B:
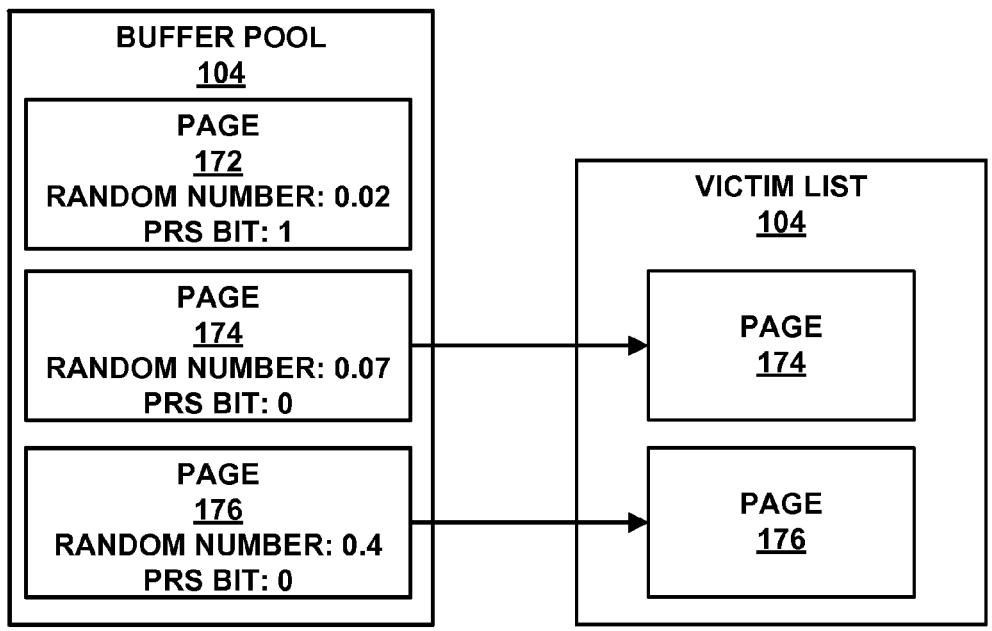
FIG. 1B is a block diagram illustrating an example technique for selecting victim pages for a buffer pool according to aspects of the present disclosure.

FIG. 1B is a block diagram illustrating an example technique for selecting victim pages for a buffer pool according to aspects of the present disclosure. In the example shown in FIG. 1B, a database table being scanned includes 30 pages. Buffer pool 104 has a capacity of 3 pages and currently caches three pages: page 172, page 174, and page 176. Thus, the optimal percentage of pages in the database table to persist in buffer pool 104 is 10%. The percentage of the optimal percentage is 33%, so that buffer pool 104 is designed to persist one of the pages of the database table. The percentage of pages of the database table to persist in the buffer pool is 10% multiplied by 33%, which equals 0.033 (i.e. 0.33%).

A random number between 0 and 1 is generated for each of the pages 172, 174, and 176. If the random number generated for a page is less than 10% multiplied by 33%, which is 0.033, then the page's page randomly saved bit is turned on (i.e. set to 1). If the random number generated for the page is larger than 0.033, then the page's page randomly saved bit remains off (i.e. remains at 0). Because the random number generated for page 172 is 0.02, which is less than 0.033, page 172's page randomly saved bit is turned on. However, because the random number generated for page 174 is 0.7, and because the random number generated for page 176 is 0.4, which are both larger than ⅓, both pages 172's and 174's page randomly saved bit 124 remain turned off. Because pages 174 and 176 are associated with a page randomly saved bit that is turned off, they are added to victim list 108 as candidates for eviction from buffer pool 104.

Figure 1C:
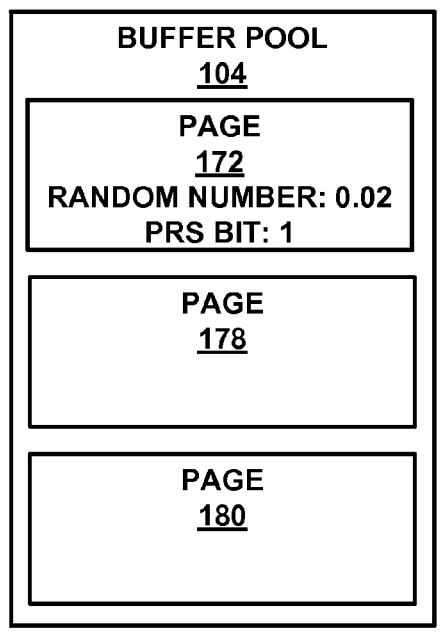
FIG. 1C is a block diagram illustrating a buffer pool after evicting pages listed in the victim list according to aspects of the present disclosure.

FIG. 1C is a block diagram illustrating a buffer pool after evicting pages listed in the victim list according to aspects of the present disclosure. As shown in FIG. 1C, if buffer pool 104 needs to evict pages from the pool in order to make room for caching additional pages, then the pages evicted from buffer pool 104 are pages that are listed in victim list 108. Because pages 174 and 176 are listed in victim list 104, those two pages may be the pages that are evicted from buffer pool 104 if the buffer pool 104 is to cache two additional pages 178 and 180. Because page 172 is not listed in victim list 104, page 172 may not be evicted from buffer pool 104 before the pages in victim list 104 are evicted from buffer pool 104.

Figure 2:
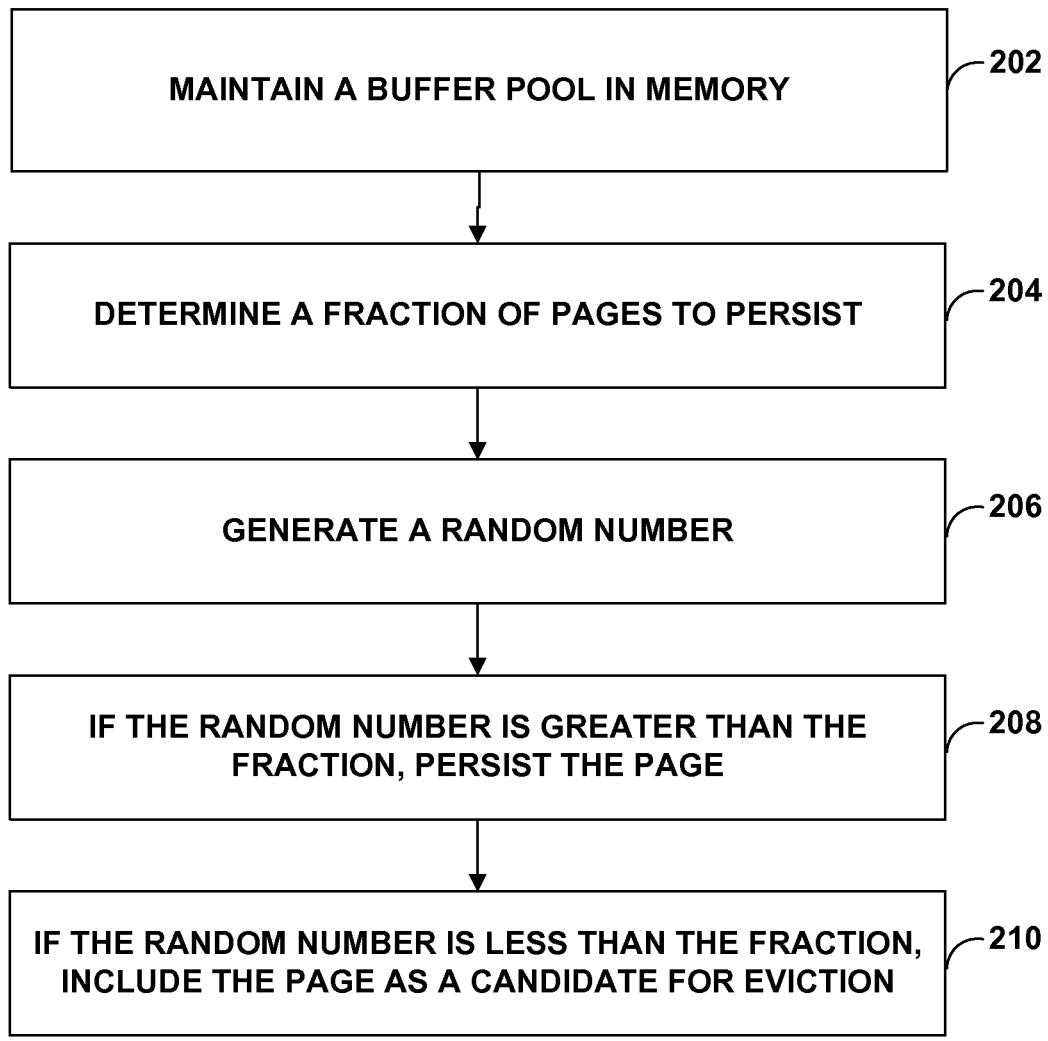
FIG. 2 is a flowchart illustrating an example method for selecting victim pages in a buffer pool according to aspects of the present disclosure.

FIG. 2 is a flowchart illustrating an example method for selecting victim pages in a buffer pool according to aspects of the present disclosure. The method may be performed by, for example, the components of computing system 100 shown in FIG. 1. As shown in FIG. 2, computing system 100 may maintain buffer pool 104 in memory (e.g., volatile memory) (202). Because the buffer pool 104 is maintained in memory, and because database 102 may be maintained on slower storage mediums such as disks, tape drives, and magneto-optical media, the buffer pool 104 may provide faster access to pages cached in buffer pool 104 compared to accessing pages in database 102.

Buffer management module 110 can determine a percentage of pages of a database table to persist in buffer pool 104 (204). In some examples, buffer management module 110 may determine a first percentage pages of a database table that can be persisted in buffer pool 104, determine a second percentage of the first percentage of pages, and multiply the first percentage by the second percentage to determine the percentage of pages of the database table to persist in buffer pool 104. In some examples, determining the second percentage of the first percentage of pages is based at least in part on feedback from a previous page reuse rate of the buffer pool.

Buffer management module 110 can generate a random number as a decimal value in a range of 0 to 1 for each page of the database table cached in buffer pool 104 (206). If the random number generated for a page is less than the fraction of pages of the database table to persist in buffer pool 104, buffer management module 110 can persist the page in buffer pool 104 (208), including associating the page with a non-zero weight. On the other hand, if the random number generated for the page is greater than the fraction of pages of the database table to persist in buffer pool 104, buffer management module 110 can include the page as a candidate for eviction from buffer pool 104 (212), including associating the page with a zero weight and adding the page to a victim list.

In some examples, associating the page with a non-zero weight may further include marking the page with a bit indicating that the page is associated with the non-zero weight and incrementing a first counter indicating that the page is associated with the non-zero weight. In some examples, the method may further include determining that a reused page found in the buffer pool is associated with the non-zero weight and, responsive to determining that the reused page is associated with the non-zero weight, incrementing a second counter to indicate that page reuse occurred. In some examples, the method may further include determining whether a value of hits on pages with non-zero weights divided by a total amount of pages with non-zero weights falls within a predefined range and, responsive to determining that the value does not fall within the predefined range, modifying the second amount of pages that is cached in the buffer pool. In some examples, the process may further include determining a likelihood of the table being re-scanned and adjusting the fraction of pages of the table to persist in the buffer pool based on the determined likelihood. In some examples, generating a random number as a decimal value in a range of 0 to 1 for each page of the table cached in the buffer pool may further include determining, for a page of the table, a cost of accessing the page from the table and generating a weighted random number based on the coast of accessing the page from the table. In some examples, persisting the page in the buffer pool may include setting a page randomly saved bit associated with the page.

Figure 3:
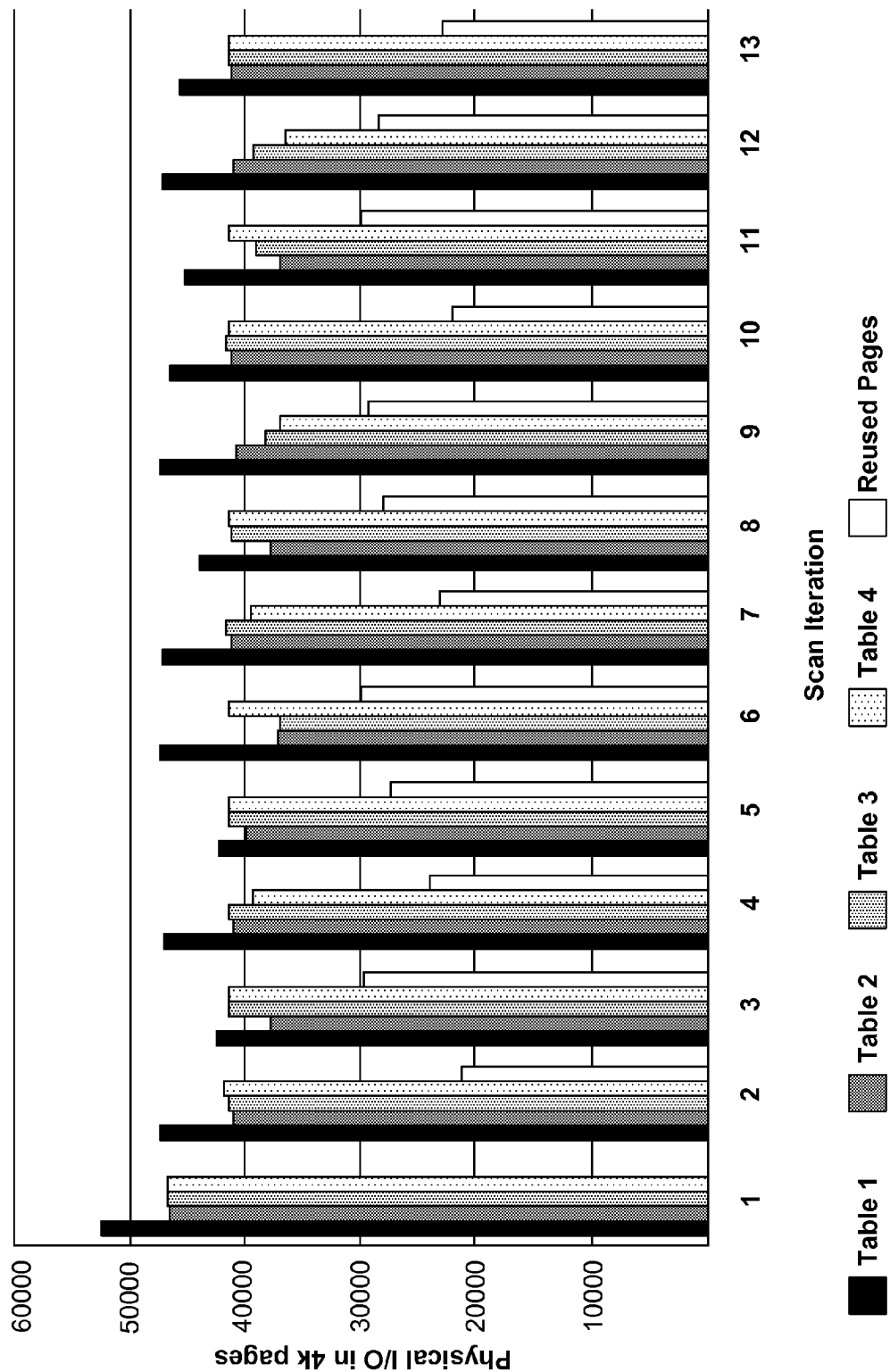
FIG. 3 is a chart illustrating page reuse in multiple iterations of table scans according to aspects of the disclosure.

FIG. 3 is a chart illustrating page reuse in multiple iterations of table scans according to aspects of the disclosure. Consecutive table scans may be performed on table 1, table 2, table 3, and table 4 of a database, such as database 102, and the consecutive table scans of those four tables may be repeatedly performed. The combined size of the four tables may be 195,000 pages, and the buffer pool, such as buffer pool 104, may have a capacity of 30,000 pages. As shown in FIG. 3, the table scans of those four tables may be performed 13 times, and page reuse may begin with the second iteration of scanning the four tables. In subsequent iterations, the buffer pool may provide good page reuse, including almost 30,000 pages in iterations 6 and 11, which is close to the capacity of the buffer pool, meaning that almost every page in the buffer pool is reused during those specific iterations.

Figure 4:
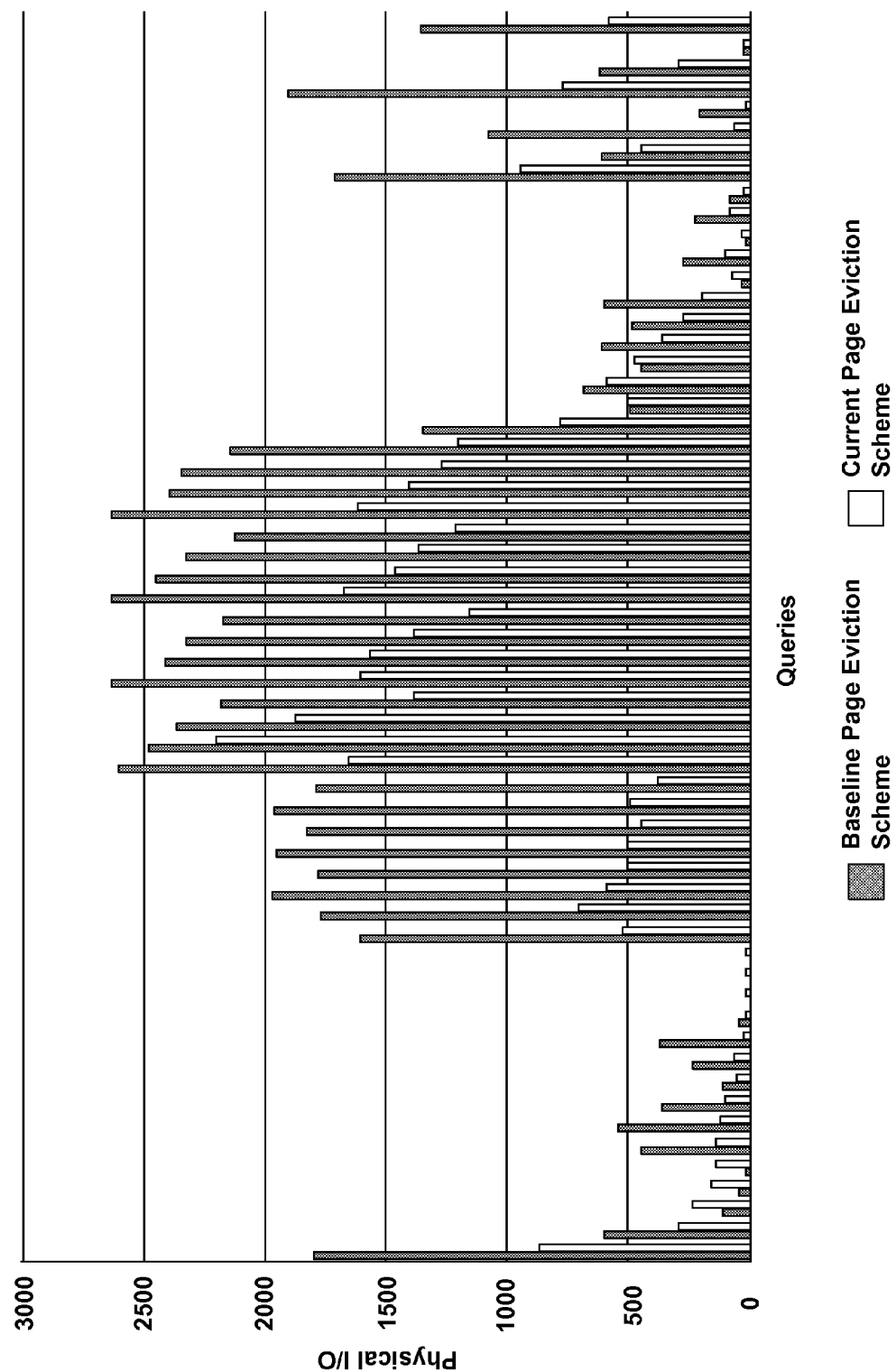
FIG. 4 is a chart illustrating the amount of physical accesses to a database in a baseline page eviction scheme compared to the page eviction scheme disclosed herein according to aspects of the present disclosure.

FIG. 4 is a chart illustrating the amount of physical accesses to a database, such as database 102, in a baseline page eviction scheme (e.g., least recently used page eviction scheme) compared to the page eviction scheme disclosed herein according to aspects of the present disclosure. Typically, more page reuse in the buffer pool may lead to decreased physical accesses to the corresponding database, because the page to be accessed is already in the buffer pool. As shown in FIG. 4, over the course of 59 queries, the database is physically accessed much less under the page eviction scheme disclosed herein compared to the baseline page eviction scheme due to better page reuse in the buffer pool of the victim selection scheme disclosed herein.

Figure 5:
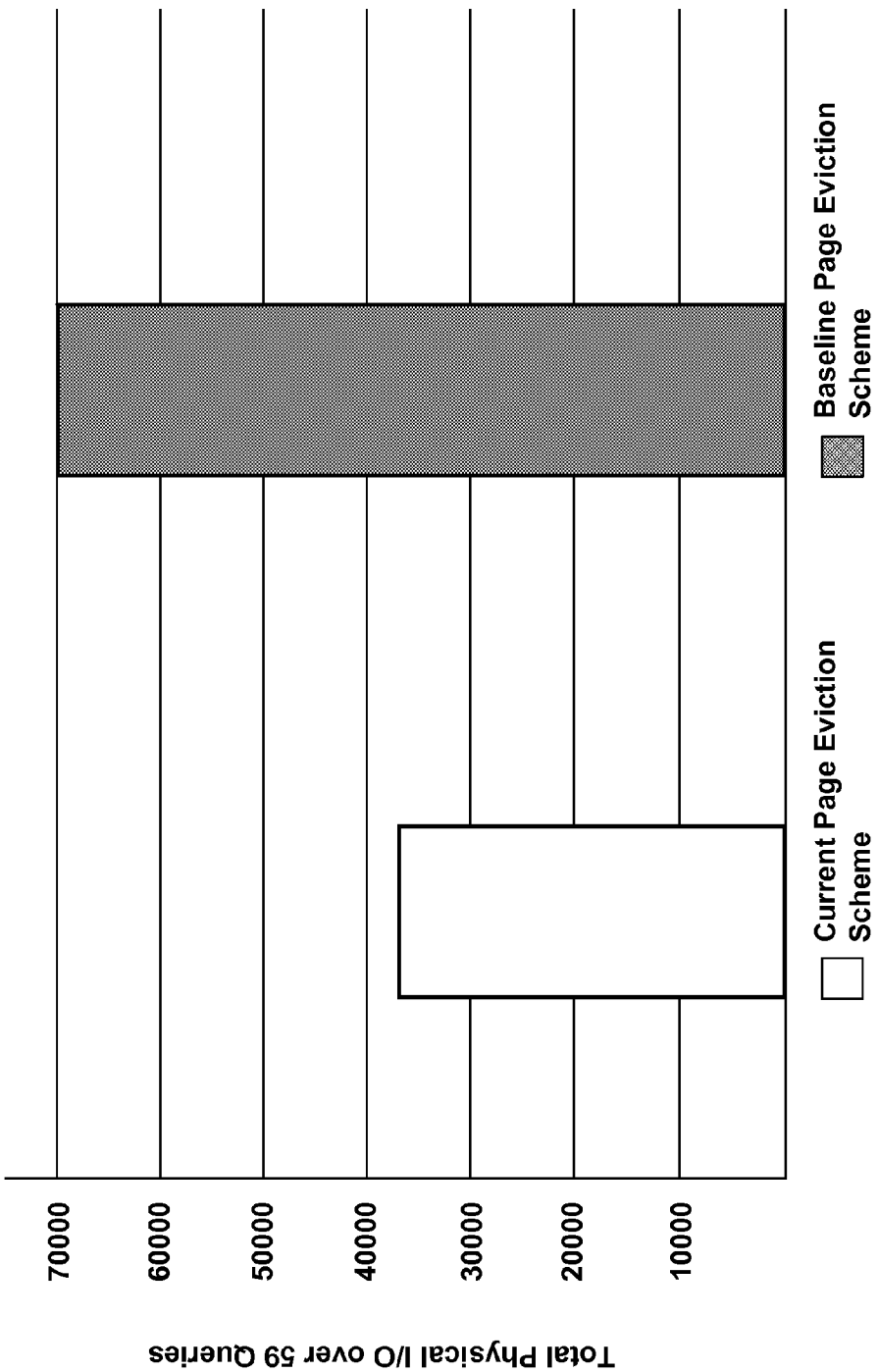
FIG. 5 is a chart illustrating the total amount of physical accesses to a database of the queries shown in FIG. 4 according to aspects of the disclosure.

FIG. 5 is a chart illustrating the total amount of physical accesses to a database of the queries shown in FIG. 4 according to aspects of the disclosure. As shown in FIG. 4, over the 59 queries, the baseline page eviction scheme physically accesses the database almost twice as much as the page eviction scheme disclosed herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A non-transitory computer-readable storage medium comprising instructions that cause a programmable processor to:
   maintain a cache;
   determine a fraction of objects of a memory to persist in the cache;
   generate a random number as a decimal value in a range of 0 to 1 for each object of the memory persisted in the cache;
   if the random number generated for a particular object is less than the fraction, persist the particular object in the cache; and
   if the random number generated for the particular object is greater than the fraction, include the particular object as a candidate for eviction from the cache.

2. The non-transitory computer-readable storage medium of claim 1, wherein persist the particular object in the cache comprises:
   associate the particular object with a non-zero weight.

3. The non-transitory computer-readable storage medium of claim 2, wherein include the particular object as a candidate for eviction from the cache comprises:
   associate the particular object with a zero weight; and
   add the particular object to a victim list, wherein objects to be evicted from the cache are chosen from objects in the victim list.

4. The non-transitory computer-readable storage medium of claim 3, wherein determine the fraction of objects of the memory to persist in the cache comprises:
   determine a first fraction of objects of the memory that can be persisted in the cache;
   determine a second fraction of the first fraction of objects; and
   multiply the first fraction with the second fraction.

5. The non-transitory computer-readable storage medium of claim 4 wherein the second fraction of the first fraction of objects is determined based at least in part on feedback from a previous object reuse rate of the cache.

6. The non-transitory computer-readable storage medium of claim 5, wherein associate the particular object with the non-zero weight further comprises:
   mark the particular object with a bit indicating that the particular object is associated with the non-zero weight; and
   increment a first counter indicating that the particular object is associated with the non-zero weight.

7. The non-transitory computer-readable storage medium of claim 6, wherein the instructions further cause the programmable processor to:
   determine that a reused object found in the cache is associated with the non-zero weight; and
   responsive to determining that the reused object is associated with the non-zero weight, increment a second counter to indicate that object reuse occurred.

8. The non-transitory computer-readable storage medium of claim 7, wherein the instructions further cause the programmable processor to:
   determine whether a value of hits on objects with non-zero weights divided by a total amount of objects with non-zero weights falls within a predefined range; and
   responsive to determining that the value does not fall within the predefined range, modify a second amount of objects that is persisted in the cache.

9. The non-transitory computer-readable storage medium of claim 1, further comprising:
   determine a likelihood of the memory being re-scanned; and
   adjust the fraction of objects of the memory to persist in the cache based on the determined likelihood.

10. The non-transitory computer-readable storage medium of claim 1, wherein generate a random number as a decimal value in a range of 0 to 1 for each object of the memory persisted in the cache further comprises:
    determine, for a second particular object of the memory, a cost of accessing the second particular object from the memory; and
    generate a weighted random number based on the cost of accessing the second particular object from the memory.

11. The non-transitory computer-readable storage medium of claim 1, wherein persist the particular object in the cache comprises:
    set a page randomly saved bit associated with the particular object.

12. A computing system comprising:
    a processor;
    memory;
    a buffer pool maintained in the memory; and a buffer management module operable by the processor and configured to:
  determine a fraction of pages of a database table to persist in the buffer pool;
  generate a random number as a decimal value in a range of 0 to 1 for each page of the database table persisted in the buffer pool;
  if the random number generated for a first page is less than the fraction, persist the page first in the buffer pool; and
  if the random number generated for the first page is greater than the fraction, include the first page as a candidate for eviction from the buffer pool.

13. The computing system of claim 12, wherein persist the first page in the buffer pool comprises:
  associate the first page with a non-zero weight.

14. The computing system of claim 13, wherein include the first page as a candidate for eviction from the buffer pool comprises:
  associate the first page with a zero weight; and
  add the first page to a victim list, wherein pages to be evicted from the buffer pool are chosen from pages in the victim list.

15. The computing system of claim 14, wherein determine the fraction of pages of the database table to persist in the buffer pool comprises:
  determine a first fraction of pages of the database table that can be persisted in the buffer pool;
  determine a second fraction of the first fraction of pages; and
  multiply the first fraction with the second fraction.

16. The computing system of claim 15, wherein the second fraction of the first fraction of pages is determined based at least in part on feedback from a previous page reuse rate of the buffer pool.

17. The computing system of claim 16, wherein associate the first page with the non-zero weight further comprises:
  mark the first page with a bit indicating that the first page is associated with the non-zero weight; and
  increment a first counter indicating that the first page is associated with the non-zero weight.

18. The computing system of claim 17, wherein the buffer management module is further configured to:
  determine that a reused page found in the buffer pool is associated with the non-zero weight; and
  responsive to determining that the reused page is associated with the non-zero weight, increment a second counter to indicate that page reuse occurred.

19. The computing system of claim 18, wherein the buffer management module is further configured to:
  determine whether a value of hits on pages with non-zero weights divided by a total amount of pages with non-zero weights falls within a predefined range; and
  responsive to determining that the value does not fall within the predefined range, modify a second amount of pages that is persisted in the buffer pool.

20. The computing system of claim 12, wherein the buffer management module is further configured to:
  determine a likelihood of the database table being re-scanned; and
  adjust the fraction of pages of the database table to persist in the buffer pool based on the determined likelihood.

21. The computing system of claim 12, wherein generate the random number as a decimal value in a range of 0 to 1 for each page of the database table cached in the buffer pool further comprises:
  determine, for a second page of the database table, a cost of accessing the second page from the database table; and
  generate a weighted random number based on the cost of accessing the second page from the database table.

22. The computing system of claim 12, wherein persist the first page in the buffer pool comprises:
  set a page randomly saved bit associated with the first page.

* * * * *